US012209550B2

(12) United States Patent
Wiens

(10) Patent No.: US 12,209,550 B2
(45) Date of Patent: Jan. 28, 2025

(54) METHOD FOR OPERATING A MOTOR VEHICLE

(71) Applicant: Robert Bosch GmbH, Stuttgart (DE)

(72) Inventor: Alexander Wiens, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/521,312

(22) Filed: Nov. 28, 2023

(65) Prior Publication Data

US 2024/0183324 A1 Jun. 6, 2024

(30) Foreign Application Priority Data

Dec. 2, 2022 (DE) ..................... 10 2022 213 044.8
Nov. 24, 2023 (DE) ..................... 10 2023 211 750.9

(51) Int. Cl.
*F02D 41/24* (2006.01)
*F02D 41/04* (2006.01)
*F02D 41/26* (2006.01)

(52) U.S. Cl.
CPC ......... *F02D 41/2467* (2013.01); *F02D 41/04* (2013.01); *F02D 41/2432* (2013.01); *F02D 41/26* (2013.01)

(58) Field of Classification Search
CPC ....... F02D 41/04; F02D 41/2432; F02D 41/26
See application file for complete search history.

(56) References Cited

U.S. PATENT DOCUMENTS

2003/0115942 A1* 6/2003 Eck ..................... F16H 61/0213 73/115.02
2003/0176259 A1* 9/2003 Frei ..................... F16H 61/0213 477/121
2013/0046427 A1* 2/2013 Hohenberg ............ B60K 6/365 180/65.265
2015/0053179 A1* 2/2015 Baqasse .............. F02D 41/2438 123/435

FOREIGN PATENT DOCUMENTS

DE 102007053406 B3 6/2009
DE 102013225152 A1 6/2015
DE 102017203849 A1 9/2018
DE 102020130104 A1 5/2021

* cited by examiner

*Primary Examiner* — John Kwon
(74) *Attorney, Agent, or Firm* — NORTON ROSE FULBRIGHT US LLP; Gerard A. Messina

(57) ABSTRACT

A method for operating a motor vehicle with a drive train, which has an internal combustion engine, wherein the motor vehicle is operated during a trip, and the motor vehicle is operated at least once in an overrun phase during the trip. During the overrun phase, a function is to be allocated for execution. An allocation of different functions takes place according to an allocation plan.

22 Claims, 6 Drawing Sheets

| Pos. | 1 | 2 | 3 | 4 | 5 | 6 | 7 |
|---|---|---|---|---|---|---|---|
| F | 1 | 1 | 0 | 1 | 1 | 1 | 0 |

| Pos. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| F | 1 | 1 | 1 | 1 | 0 | 1 | 1 | 1 | 0 | 1 | 1 | 1 | 1 | 0 | 1 | 1 | 1 | 0 | 1 | 1 | 1 | 1 | 0 | 1 | 1 |

| Pos. | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|---|---|---|---|---|---|---|---|
| F | 1 | 0 | 1 | 1 | 1 | 1 | 0 | 1 | 1 | 1 | 0 | 1 | 1 | 1 | 1 | 0 | 1 | 1 | 1 | 0 | 1 | 1 | 1 | 1 | 0 |

| n | % | n1 | n2 | n1+n2 | n2x10 | (n1+n2)x10 | GGT | gzN | gzZ | QD | R |
|---|---|---|---|---|---|---|---|---|---|---|---|
| 1 | 6 | 94 | 6 | 100 | 60 | 1000 | 20 | 3 | 50 | 16 | 2 |
| 2 | 13 | 87 | 13 | 100 | 130 | 1000 | 10 | 13 | 100 | 7 | 9 |
| 3 | 15 | 85 | 15 | 100 | 150 | 1000 | 50 | 3 | 20 | 6 | 2 |
| 4 | 17 | 83 | 17 | 100 | 170 | 1000 | 10 | 17 | 100 | 5 | 15 |
| 5 | 18 | 82 | 18 | 100 | 180 | 1000 | 20 | 9 | 50 | 5 | 5 |
| 6 | 21 | 79 | 21 | 100 | 210 | 1000 | 10 | 21 | 100 | 4 | 16 |
| 7 | 22 | 78 | 22 | 100 | 220 | 1000 | 20 | 11 | 50 | 4 | 6 |
| 8 | 26 | 74 | 26 | 100 | 260 | 1000 | 20 | 13 | 50 | 3 | 11 |
| 9 | 27 | 73 | 27 | 100 | 270 | 1000 | 10 | 27 | 100 | 3 | 19 |
| 10 | 28 | 72 | 28 | 100 | 280 | 1000 | 40 | 7 | 25 | 3 | 4 |
| 11 | 34 | 66 | 34 | 100 | 340 | 1000 | 20 | 17 | 50 | 2 | 16 |
| 12 | 35 | 65 | 35 | 100 | 350 | 1000 | 50 | 7 | 20 | 2 | 6 |
| 13 | 36 | 64 | 36 | 100 | 360 | 1000 | 40 | 9 | 25 | 2 | 7 |
| 14 | 37 | 63 | 37 | 100 | 370 | 1000 | 10 | 37 | 100 | 2 | 26 |
| 15 | 38 | 62 | 38 | 100 | 380 | 1000 | 20 | 19 | 50 | 2 | 12 |
| 16 | 39 | 61 | 39 | 100 | 390 | 1000 | 10 | 39 | 100 | 2 | 22 |

Fig. 10 (Table 1)

METHOD FOR OPERATING A MOTOR VEHICLE

BACKGROUND INFORMATION

German Patent Application No. DE 10 2013 225 152 A1 describes a method for calibrating an injection insert with a high-pressure accumulator of an internal combustion engine. It is in this case provided that a so-called pre-injection quantity be regularly calibrated since this pre-injection quantity changes over the course of the service life of the components due to drift effects. The pre-injection is usually, inter alia, calibrated under so-called overrun boundary conditions. The motor vehicle is in so-called overrun operation, which is also occasionally referred to as coasting operation. In a motorized motor vehicle, this refers to the driving state in which the internal combustion engine is in this case hauled by the motor vehicle. In this case, there is a non-disconnected non-positive connection between the internal combustion engine and the rotationally moving wheels of the motor vehicle, i.e., a normal driving clutch between the internal combustion engine and the transmission is not disconnected, i.e., closed. The overrun or coasting operation also occurs in motor vehicles with an automatic transmission and a hydrodynamic converter.

SUMMARY

According to a first aspect of the present invention, a method for operating a motor vehicle, which has a drive train with an internal combustion engine, is provided. The motor vehicle is operated during a trip, wherein the motor vehicle is operated at least once in an overrun phase during the trip. In this case, according to an example embodiment of the present invention, it is provided that, during an overrun phase, a function be allocated for execution of the function. The method is characterized in that an allocation of different functions takes place according to an allocation plan. Such an allocation plan has the advantage that it is clear from the outset which function is to be allocated or will be allocated for the next overrun phase. In this respect, it is important, for example, that the legislator could prescribe, for example, that different functions are to be used in internal combustion engines, which, for example, test devices of the internal combustion engine, and thus also, for example, parts of the fuel supply, for functionality or precision of a function. If an allocation of different functions and, more particularly, an execution of different functions in a particular ratio of the allocations is required, the required ratio can be determined or determinable from the outset by an allocation plan for the different functions in order to thereby satisfy legal requirements. Such an allocation plan can document from the beginning that the vehicle or the internal combustion engine or components of this internal combustion engine will be checked in accordance with this allocation plan for function or proper function. This has the advantage that a foreseeable distribution is made possible by this allocation plan.

According to a further aspect of the present invention, it is provided that the allocation plan have a basic pattern of a sequence of allocations of the one function and of allocations of the other function, and an allocation, or the allocations, is performed in this sequence. Such a procedure has proven to be advantageous insofar as it is ensured by the basic pattern and its repetition that the planned ratio of allocations of the different functions is ensured in the actually occurring allocations. In this case, such a basic pattern can extend via a sequence of allocations over several overrun phases or such a basic pattern can also, for example, be allocated completely in one overrun phase, or more than one basic pattern of a sequence of allocations of the one function and of allocations of the other function can be allocated in one overrun phase. It is ultimately a question of how long such an overrun phase lasts, which scope of functions a basic pattern has, how much time the individual functions require after their allocation in order to respectively run completely or optionally only partially, and how often these functions are to be allocated.

According to a further aspect of the present invention, it is provided that a function be allocated only within the framework of a basic pattern. This relates to the function or the functions whose allocation is to take place via such a basic pattern or according to such a basic pattern. A function whose allocation does not take place within the framework of this basic pattern ("third function") can or is optionally allocated outside the basic pattern. The allocation, only within the framework of a basic pattern, may have the advantage that the allocation plan is not abandoned and, accordingly, an optionally prescribed specification is fulfilled.

According to a further aspect of the present invention, it is provided that the basic pattern has, in particular only has, a predeterminable or predetermined ratio of allocations of the one function and of allocations of the other function. A corresponding allocation plan then has a desired or required distribution ratio between the functions. According to a further embodiment of the present invention, a basic pattern can in this case have a predetermined number of allocations of the one function and a predetermined number of allocations of the other function.

According to a further aspect of the present invention, it is provided that a basic pattern be determined by the following steps: A dividend and a divisor are determined; a step is carried out, which is at least equivalent to an integer division with the dividend and the divisor. In this case, the dividend corresponds to a sum of the predetermined number of allocations of the one function per basic pattern and the predetermined number of allocations of the other function per basic pattern. The divisor corresponds to the predetermined number of allocations of the other function per basic pattern. From this division or this step, an integer quotient is ascertained in a further step. In addition, the remainder of the integer division is determined.

In this case, according to an example embodiment of the present invention, it is advantageously provided that, before carrying out the step that is equivalent to the division, either the dividend and the divisor are fully reduced or it is determined that the dividend and the divisor are fully reduced.

A number of subpatterns that are part of the basic pattern is determined from the integer quotient. More particularly, it is provided that the number of subpatterns of a basic pattern is equal to the integer quotient.

According to a further aspect of the present invention, a number of allocations of the other functions is determined, wherein the number corresponds to the magnitude of the remainder. By means of these functions, the set of subpatterns that are part of the basic pattern is supplemented so that a basic pattern is complete. This completeness represents the required ratio of allocations of the one function and of allocations of the other function within the basic pattern. Accordingly, the basic pattern is formed from this number of functions with the number of subpatterns.

Furthermore, an allocation is respectively added to a number of subpatterns corresponding to the magnitude of the remainder, and a modified subpattern is thereby formed, and the basic pattern is finally determined as a sequence of the number of subpatterns and the number of modified subpatterns. This sequence results in a very good distribution of changes from the one function to the other function.

According to a further embodiment of the present invention, it is provided that the allocation plan is stored in a memory. This has the advantage that this allocation plan is defined, for example before starting the motor vehicle or the internal combustion engine, and that it is possible to check, for example during technical inspections of the motor vehicle or of the internal combustion engine, whether the functions are allocated according to the allocation plan and are, for example, also processed accordingly. This can, for example, take place on a roller dynamometer. Accordingly, the allocation plan can also be read according to a further embodiment.

In order for a basic pattern of allocations to be processed properly, it is advantageously provided that, in connection with allocating the functions, a current position, e.g., the last allocated position or the next position to be allocated, be stored in the allocation plan. In any case, it is provided that, in connection with allocating the functions, a feature be stored that makes it possible to determine the next function to be allocated in a basic pattern.

According to a further embodiment of the present invention, it is provided that an allocation plan be generated in a control unit in the motor vehicle. With such a procedure, individual features of the motor vehicle can be included. Alternatively, an allocation plan can be generated outside the control unit and then stored, in particular stored unchangeably, in a memory of the motor vehicle. In the procedure mentioned last, it is possible for corresponding devices in the motor vehicle not to have to be equipped with corresponding software and computer capacity for generating the allocation plan.

The mentioned different functions, which are allocated for use in connection with the allocation plan, comprise, for example, a function for monitoring a quantity of injected fuel and a function for adapting a small quantity of injected fuel or fuel to be injected.

Furthermore, according to an example embodiment of the present invention a computer program is provided and designed to perform all steps of one of the methods disclosed herein or is programmed in such a way that a method according to the present invention is performed when the computer program is executed on a computer.

The present invention is explained in more detail using the figures, described below, and a table.

BRIEF DESCRIPTION OF THE DRAWINGS

FIG. 10 shows Table 1, which shows an overview of reference values used in various exemplary cases for the calculation or ascertainment of a basic pattern, according to the present invention.

DETAILED DESCRIPTION OF EXAMPLE EMBODIMENTS

Figure 1:
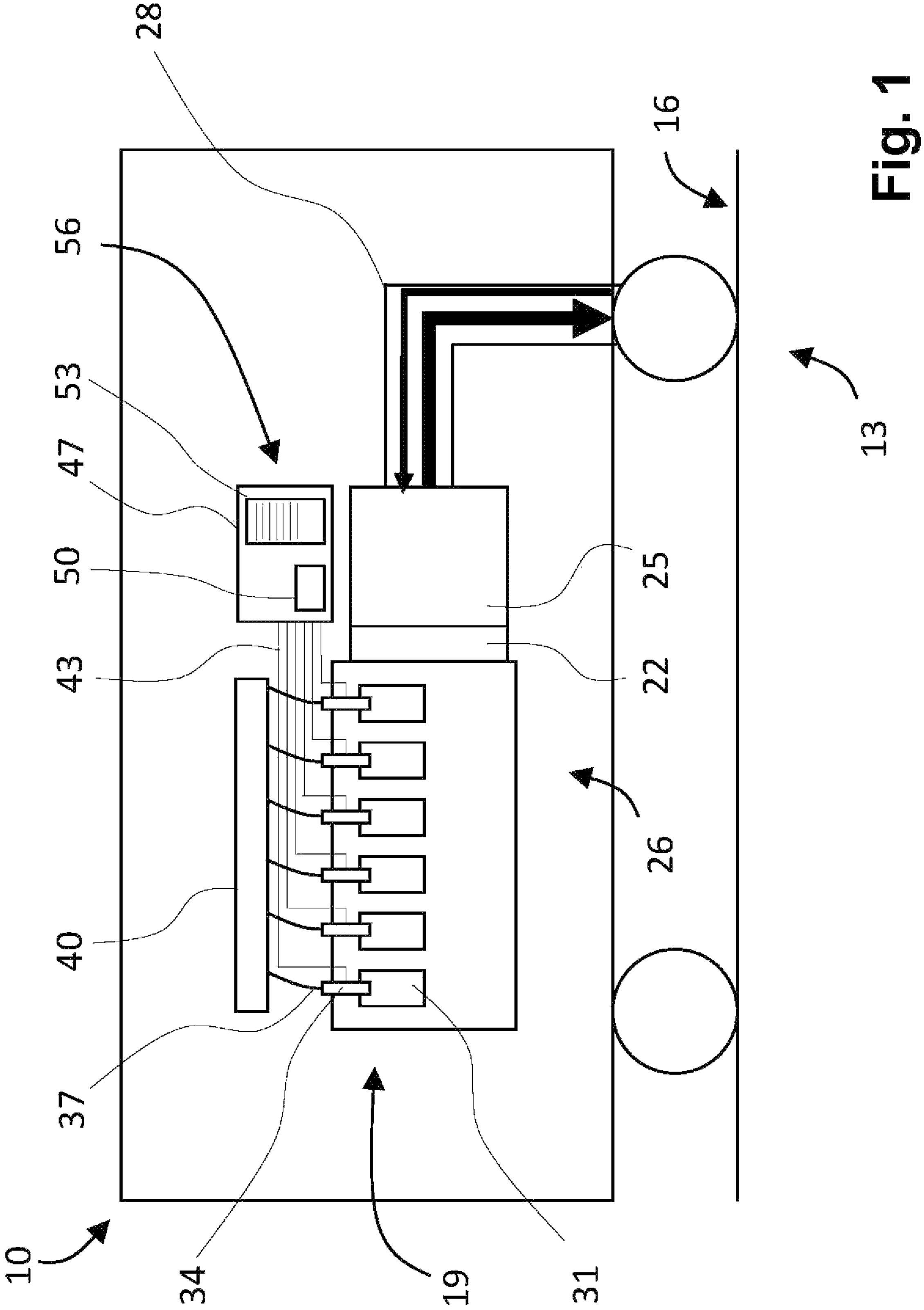
FIG. 1 shows a motor vehicle with an internal combustion engine, a part of the fuel supply system of the latter, a control unit and the drive train thereof.

FIG. 1 shows a motor vehicle 10 which has at least one drive means 13, preferably in the form of an at least one wheel. The motor vehicle 10 with the drive means 13 stands on a ground 16 and typically moves on this ground 16. The motor vehicle 10 also has an internal combustion engine 19, which is connected to a transmission 25 by means of a clutch 22. The internal combustion engine 19, the clutch 22 and the transmission 25 are part of a drive train 26. The transmission 25 supplies a further part of the drive train 26, the drive train part 28, with mechanical energy (torque, rotational speed) and thus drives the drive means 13. If the internal combustion engine 19 drives the motor vehicle 10, the internal combustion engine 19 drives (rotational speed, torque) a drive shaft (not shown here), which drives a clutch input part of the clutch 22. If the clutch 22 is switched to transmit torque, a clutch output part transmits mechanical energy to an input shaft of the transmission 25. Depending on the selected gear stage in the transmission 25, the mechanical energy is passed, with an output speed dependent thereon and an output torque dependent thereon, to the drive train part 28 and is transmitted to the drive means 13. This describes the drive state of the motor vehicle 10. So that the internal combustion engine 19 can transmit a torque, fuel is introduced into the individual cylinders 31 in a conventional manner, is ignited, and the torque on a crankshaft as a drive shaft is generated by the intended combustion in the cylinders 31. Fuel is fed to the injectors 34 via individual fuel supply lines 37, coming from a high-pressure accumulator 40 for fuel (e.g., common rail). For this purpose, the individual injectors 34 are controlled by a control unit 47. For this purpose, energy is supplied to drive elements (not shown here) of the injectors 34 via electrical connections 43 at the correct times so that valves of the injectors 34 can open. A processor 50 in which the provided commands are processed is located in the control unit 47. In addition, a memory 53 for data, in particular digital data, is preferably located in this control unit 47. These data in this memory 53 can, for example, comprise a computer program 56 which is designed to perform all steps of one of the methods or which is programmed in such a way that it performs a method when it is executed on a computer (processor 50, control unit 47).

During operation of the internal combustion engine 19, it is provided that different functions be executed on the internal combustion engine 19. These functions include, for example, the function F1 and the function F2. The function F1 can, for example, be a so-called quantity monitoring function, and the function F2 can be a so-called small quantity adaptation function. The execution of these functions F1, F2 in principle takes place as intended during an overrun phase of the internal combustion engine 19.

Figure 2:
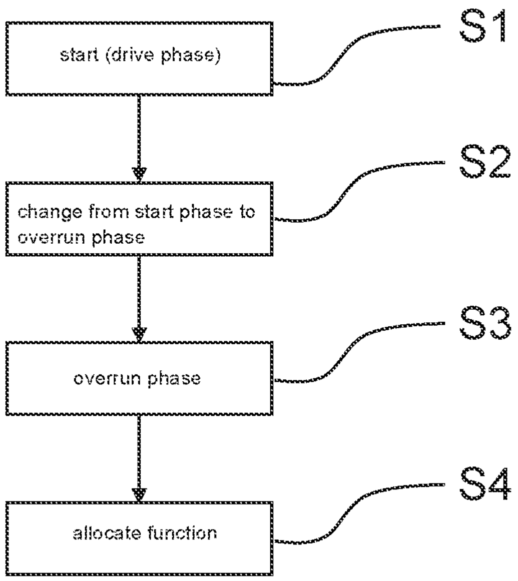
FIG. 2 shows a schematic flow of a method according to an example embodiment of the present invention.

When a motor vehicle 10 is started, FIG. 2, (start S1), a drive phase S2 is typically initiated first thereafter and carried out. During such a drive phase, mechanical energy is transmitted via the drive train 26 onto or to the drive means 13 so that the motor vehicle 10 can move on the ground 16 in the driven state. If, for example, such a motor vehicle 10 is moved in the inner city and if, for example, this motor vehicle 10 approaches a traffic light signaling "stop," the operating mode of the motor vehicle 10 is typically changed from a drive phase S2 to an overrun phase S3. In this overrun phase S3, the internal combustion engine 19 does not provide any mechanical energy; rather, this internal combustion engine 19 receives energy in the overrun phase S3, which is symbolically depicted by the narrower arrow between the drive means 16 and the transmission 25. The wide arrow symbolizes the case of transmitting drive energy from the internal combustion engine 19 to the drive means 13. The allocation of a function F1, F2 in a step S4 takes place according to an allocation plan P. In principle, a method for operating a motor vehicle 10, which has a drive train 26 with an internal combustion engine 19, is provided. During a trip, the motor vehicle 19 is operated at least once in an overrun phase S3. In this case, it is provided that, during the overrun phase S3, a function F1, F2 is to be allocated for execution on the internal combustion engine 19. In this case, an allocation S4 of different functions F1, F2 takes place according to an allocation plan P. This allocation plan P in principle has a basic pattern 100 that is repeated during the course of the method. Such a basic pattern 100 has a sequence of allocations S4 of the one function F1 and of allocations F4 of the other function F2.

Figure 3:
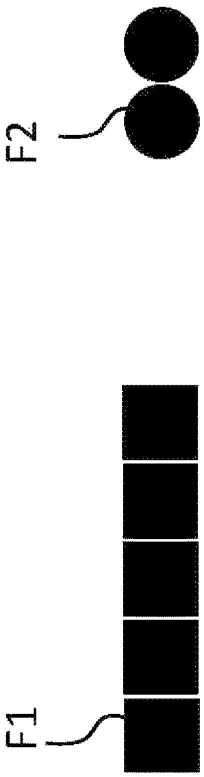
FIG. 3 shows the numbers of the individual different functions that are to be assigned to an exemplary basic pattern, according to the present invention.
Figure 4:
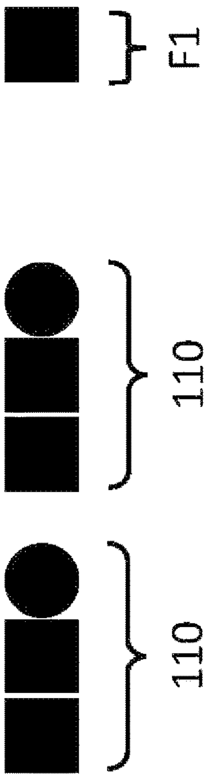
FIG. 4 shows two subpatterns of respectively two functions of the one type and one function of the other type, and a single function of the one type before forming the exemplary basic pattern, according to the present invention.
Figure 5:
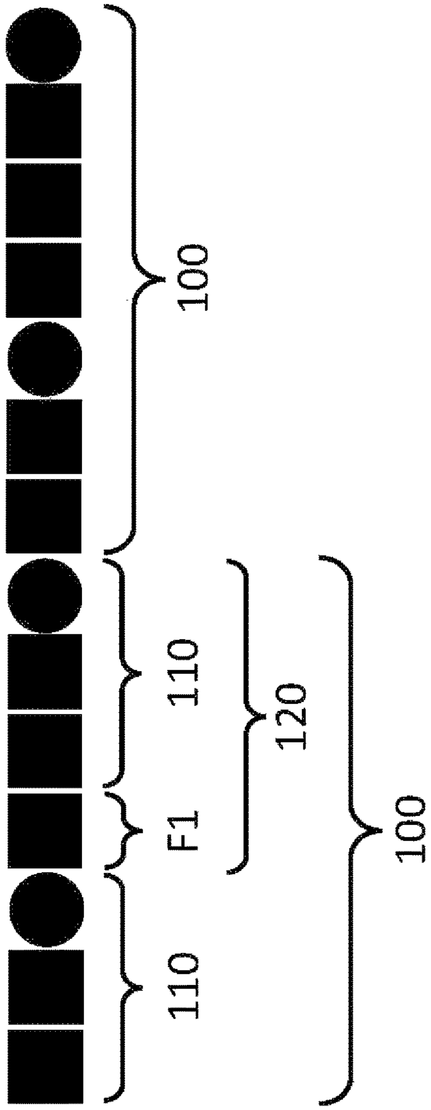
FIG. 5 shows a temporal arrangement of two exemplary basic patterns, according to the present invention.

The representations in FIGS. 3, 4 and 5 schematically show the composition of an exemplary basic pattern 100. FIG. 3 shows that this exemplary basic pattern 100 has and should have a predeterminable and here predetermined ratio of allocations S4 of the one function F1 and of allocations S4 of the other function F1. For example, it is provided that the basic pattern 100 provided here has or should have a predeterminable ratio of allocations of the one function F1 and of allocations S4 of the other function F2 in the ratio of F1/F2=5:2. Accordingly, FIG. 3 symbolically shows five functions F1 and two functions F2. Alternatively or synonymously, it can also be formulated that a basic pattern 100 has a predetermined number n1 of allocations S4 of the one function F1 and a predetermined number n2 of allocations S4 of the other function F2. FIG. 4 shows that, in the given ratio of allocations S4 of the one function F1 and of allocations S4 of the other function F2 in the ratio of F1/F2=n1/n2=5:2, two subgroups 110 of respectively two functions F1 and one function F2, as well as a single function F1 still to be assigned, result. As shown in FIG. 5, a basic pattern 100 can be repeated. Moreover, it should be noted at this point that repetition of the basic pattern 100 will take place in large numbers as expected. If it is assumed, for example, that a motor vehicle is operated over 100,000 km almost or only in city traffic and that two to three overrun phases S3 arise per kilometer, 300,000 overrun phases can be expected on this route, for example. If a basic pattern has ten allocations S4, for example, this means in the case of, by way of example, one allocation S4 per overrun phase that a corresponding basic pattern can be repeated almost 30,000 times per 100,000 km.

A basic pattern 100 can in this case be determined according to the method described below for determining a basic pattern 100. As already mentioned, a predetermined number n1 of allocations S4 of the one function F1 and a predetermined number n2 of allocations S4 of the other function F2 are to be performed per basic pattern. In the example according to FIGS. 3 to 5, this means that n1=5 and n2=2. In order to determine the basic pattern 100, an integer division is performed in a step P1. The dividend Dd is ascertained as the sum of the predetermined number n1 of allocations S4 of the one function F1 per basic pattern 100 and the predetermined number n2 of allocations S4 of the other function F2 per basic pattern 100 (Dd=n1+n2=7). The divisor Dr corresponds to the number n2 of allocations S4 of the other function F2 per basic pattern 100, Dr=n2. Before carrying out step P1, which is at least equivalent to the integer division, either the dividend Dd and the divisor Dr are fully reduced or it is determined that the dividend Dd and the divisor Dr are fully reduced. In the division to be performed here, it is determined that the dividend Dd and the divisor Dr are fully reduced (Dd/Dr=7/2). In the specific case according to the exemplary embodiment according to FIGS. 3 to 5, this means that an integer division 7:2 is performed. From this division, the so-called integer quotient QD of the integer division (step P1) is determined in step P2. From this integer division, the number 3 results as the integer quotient QD. The number QD corresponds to a length of a subpattern 110, which thus comprises three allocations S4 of the functions F1, F2. According to this integer division, the number R=1 results in step P3 as the remainder R of this integer division. Subsequently, a number n3 of subpatterns 110 is determined in that this number n3 is equated with the divisor. This means that the number n3 of subpatterns 110 in this case is n3=2. In a step P4, an allocation S4 of a function F1 is respectively added to a number n4 of subpatterns 110 that corresponds to the magnitude of the remainder R. The basic pattern 100 is formed from this number n4 of allocations S4 of the function F1 and with the number n3 of subpatterns 110. By adding an allocation, a modified subpattern 120 is formed in a step P5. In a step P6, the basic pattern 100 is then determined, wherein the latter is a sequence of the number of subpatterns 110 and the modified subpattern 120. As becomes clear in comparison with the representations according to FIGS. 3, 4 and 5, the dividend Dd=7=n1+n2, the divisor Dr=2=n2, the integer quotient QD=3, the remainder R=1 in the example performed there. Accordingly, a number n3 of subpatterns 110, which form the basic pattern 100, is n3=2. Accordingly, a basic pattern 100 corresponds to a series of subpatterns 110 or of subpatterns 110 and modified subpatterns 120. The position of a subpattern 110 at which the number of the function, here the single function, F1 (R=1=n4) is appended or inserted, is initially of no importance. This applies at least for a single allocation S4 in the case of or due to R=1. In principle, the allocations S4 that result through the remainder R could be appended to a series initially formed only by subpatterns 110, or could be appended to a subpattern 110 in an undistributed manner. If a distribution of the allocations S4 of the functions F1, F2 only across complete basic patterns 100 is then considered, the ratio F1/F2 of the distribution of the allocations S4 of the functions F1, F2 is achieved sufficiently accurately. However, if the ratio F1/F2 is also to be achieved as accurately as possible within a basic pattern 100, i.e., in the case of a (sufficiently large) selection nA of consecutive allocations S4 (nA<(n1+n2)) and a remainder R greater than 1, e.g., R=2, it is recommended to then distribute the corresponding allocations S4 of the function F1 as uniformly as possible to the subpatterns 110.

Figure 6:
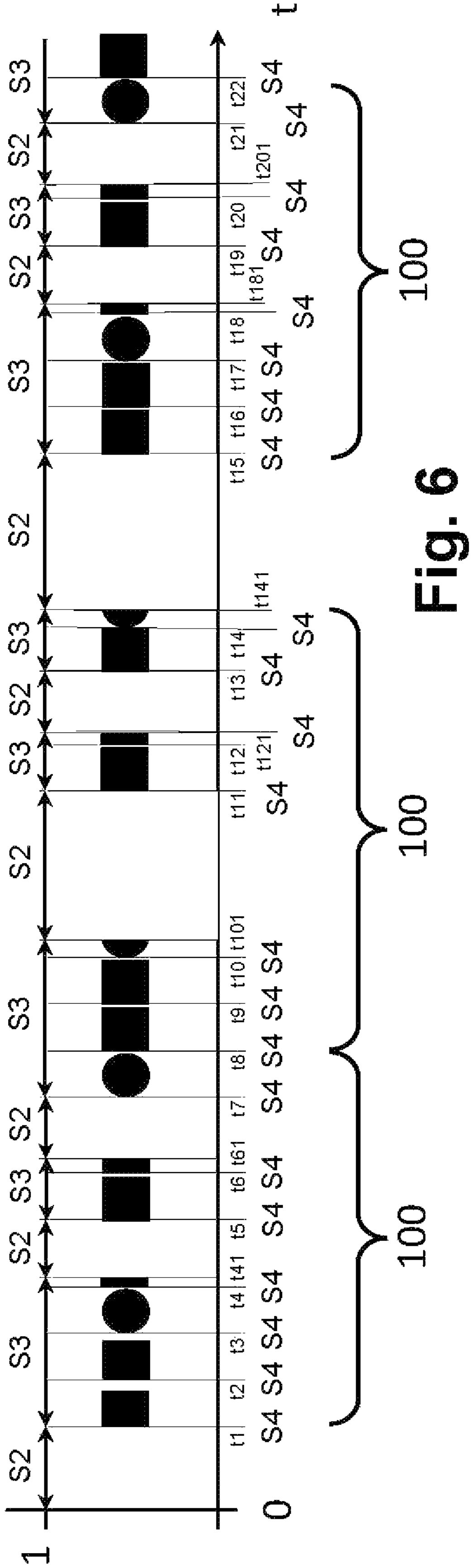
FIG. 6 shows a temporal sequence of a trip of a motor vehicle after the latter has been started at time t=0, according to an example embodiment of the present invention.

FIG. 6 shows a temporal sequence of a trip of a motor vehicle 10 after the latter has been started at time t=0. The previously determined allocation plan is used here. At time t=0, a drive phase S2 of the motor vehicle begins, which ends at time t1. At the end of this drive phase S2 at time t1, an overrun phase S3 begins, which is terminated between t4 and t5, at time t41. At time t1, i.e., at the beginning of the overrun phase S3, a first function F1 is allocated (allocation S4) and the corresponding program or the associated program sequence is processed before, optionally immediately before, reaching time t2. A function pause can be between the end of the execution of the function F1 and the next allocation S4, i.e., neither the function F1 nor the function F2 is executed or used over a time period not specified in more detail here. At time t2, the next allocation S4 takes place, which in this case again represents an allocation S4 of the function F1. A function pause can again be between the end of the here second execution of the function F1 and the next allocation S4, i.e., neither the function F1 nor the function F2 is executed or used over a time period not specified in more detail here. At time t3, an allocation S4 of the function F2 is performed. As already beforehand, a function pause can again be between the end of the execution of the function F2 and the next allocation S4, i.e., neither the function F1 nor the function F2 is executed or used over a time period not specified in more detail here. A next allocation S4 of a function F1 begins after time t4 has elapsed, but this function is only allocated and is not processed completely. Rather, this function F1 is terminated during its execution as a result of an end of the overrun phase S3 at time t41. A further drive phase S2 begins at time t41. This drive phase S2 is terminated at time t5 and the next overrun phase S3 begins. Since, according to this FIG. 6, the pattern of functions or the basic pattern 100 known by way of example from FIG. 5 and the associated description is processed repeatedly, the previously allocated function F1 is followed by the one function F1 as the next allocation S4, which is followed after its processing by a further allocation S4 of a function F1. After the time has elapsed, at time t61, this function F1 is also aborted, or terminated before complete processing. At time t61, the next drive phase S2 begins, which is terminated at time t7. According to the aforementioned basic pattern 100, this next overrun phase S3 begins with an allocation S4 of a function F2, which is processed until time t8 (FIG. 6), or alternatively optionally with a pause before time t8, i.e., between times t7 and t8. According to the basic pattern 100, this function F2 is thereafter followed by two functions F1 passed through completely. At the end of the second pass through the function F1, an allocation S4 of a further function F2 follows at time t10, which function is however likewise terminated at time t101 after a certain time and without completely passing through the function F2 (abort of the function). The abort takes place due to the next subsequent drive phase S2. After a further drive phase S2 has been passed through, is terminated at time t11 and thus followed by a new overrun phase S3, a further allocation S4 of a function F1 takes place, which, after its execution, is followed at time t12 by a further allocation S4 of a function F1, which is likewise not processed completely because it is terminated at time t121 due to the beginning drive phase S2. The further drive phase S2 follows until time t13. At this time, a further overrun phase S3 and an allocation S4 of a function F1 begin again between times t13 and t14, which is then followed by an allocation S4 of a function F2 at time t14, which is again terminated at time t141 after incomplete processing. As can be seen when viewing this FIG. 6, a basic pattern 100 is processed once overall between time t1 and time t8, or allocations of the individual functions F1, F2 take place according to the previously ascertained basic pattern 100. In the time period between time t8 and time t141, a further basic pattern 100 is implemented and the functions F1, F2 are allocated accordingly. The same applies to the time period between time t15 and time t22.

Accordingly, FIG. 6 discloses a method for operating a motor vehicle 10 with a drive train 26, which has an internal combustion engine 19, wherein the motor vehicle 10 is operated during a trip, and the motor vehicle 10 is operated at least once in an overrun phase S3 during the trip, wherein it is provided that, during the overrun phase S3, a function F1, F2 is allocated S4 for execution. In this case, an allocation S4 of different functions F1, F2 takes place according to an allocation plan P. The allocation plan P has a basic pattern 100 of a sequence of allocations S4 of the one function F1 and of allocations S4 of the other function F2. An allocation S4 is performed in this sequence. If a function F1, F2 of a basic pattern 100 is terminated after incomplete processing, the next function F1, F2 to be allocated of the basic pattern 100 is allocated according to the basic pattern 100. In this case, the function F1, F2 that is terminated after incomplete processing is not the last function F1, F2 of a or the basic pattern 100. In other words, the function F1, F2 that is terminated after incomplete processing is followed in the basic pattern 100 by at least one further function F1, F2, which is allocated according to the basic pattern 100. This is shown in FIG. 6 in all three basic patterns 100 shown there.

Furthermore, FIG. 6 discloses a method for operating a motor vehicle 10 with a drive train 26, which has an internal combustion engine 19, wherein the motor vehicle 10 is operated during a trip, and the motor vehicle 10 is operated at least once in an overrun phase S3 during the trip, wherein it is provided that, during the overrun phase S3, a function F1, F2 be allocated S4 for execution. In this case, an allocation S4 of different functions F1, F2 takes place according to an allocation plan P. The allocation plan P has a basic pattern 100 of a sequence of allocations S4 of the one function F1 and of allocations $4 of the other function F2. An allocation S4 is performed in this sequence. If a last allocated function F1, F2 of a basic pattern 100 is terminated after incomplete processing thereof, the next function F1, F2 to be allocated of a basic pattern 100 is allocated according to the next basic pattern 100. This is shown in FIG. 6 in the center one of the three basic patterns 100 shown there.

As described above, a function whose allocation does not take place within the framework of this basic pattern ("third function F3") can optionally be allocated outside a basic pattern, i.e., for example, between two basic patterns 100 or before a basic pattern 100 or after a basic pattern 100.

Figure 7:
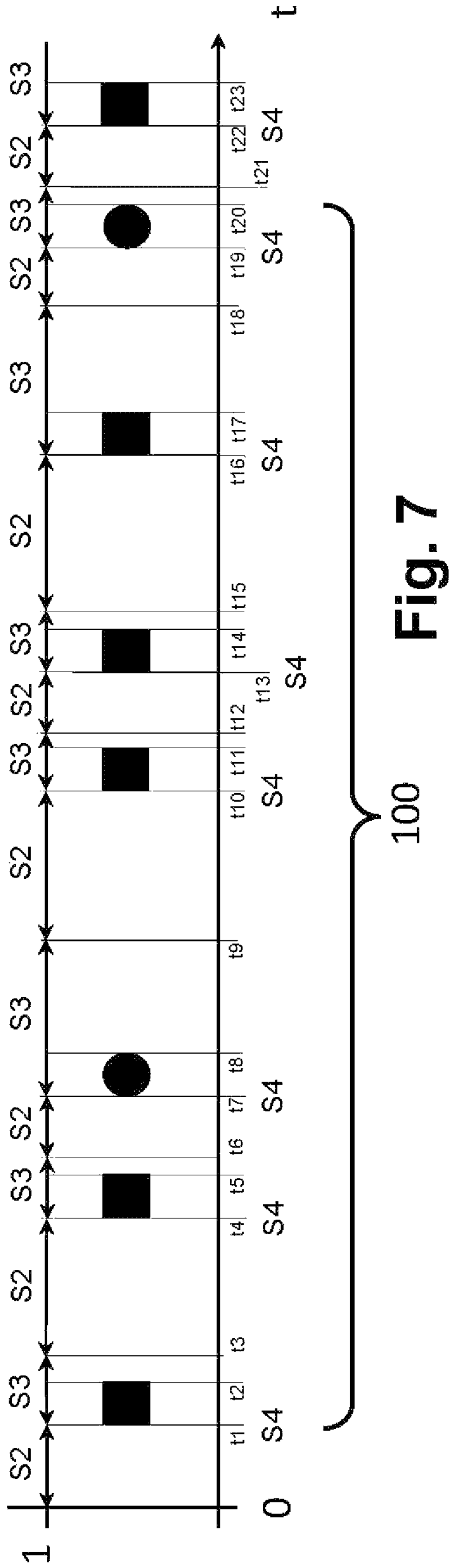
FIG. 7 shows a second exemplary embodiment for allocations of the functions F1, F2 according to the prepared basic pattern 100, according to the present invention.

FIG. 7 shows a second exemplary embodiment for allocations S4 of the functions F1, F2 according to the prepared basic pattern 100. According to the sequences provided there, drive phases S2 and overrun phases S3 alternate. They start at the times given. In contrast to the preceding exemplary embodiment, only one function F1, F2 is allocated per overrun phase S3. Accordingly, only one function F1 is allocated for the first overrun phase S3 beginning at time t1. After the complete execution thereof, time t2, no further function F1, F2 is allocated during this overrun phase S3. After the end of this overrun phase S3, a further drive phase S2 takes place, which begins at time t3 and is terminated at time t4. At this time t4, a further overrun phase S3 begins, which ends at time t6. At the beginning of this overrun phase S3 at time t4, a further function F1 is allocated. After a further drive phase S2 between times t6 and t7, a further overrun phase S3 begins between times t7 and t9. According to the basic pattern 100, a function F2 is now allocated at time t7, wherein the function is processed by time t8. A further drive phase S2 takes place between time t9 and time t10. At the beginning of the next overrun phase S3 at time t10, a further function F1 is allocated, which is processed at time t11. Until the end of the overrun phase S3 at time t12, no further allocation of a function F1, F2 takes place. A further drive phase S2 takes place between time t12 and time t13. Only at the beginning of a next overrun phase S3 at time t13 does an allocation of the next function F1 begin, which ends at time t14. Until the end of the overrun phase S3, no further allocation of a function F1, F2 takes place again. Between the end of the overrun phase S3 at time t15, which at the same time is the beginning of the next drive phase S2, which ends at time t16, no allocation of a function F1, F2 takes place again. At the beginning of the next overrun phase S3 at time t16, the next allocation of a function F1 takes place, which ends at time t17. After the end of the overrun phase S3 at time t18 and the simultaneous beginning of the next drive phase S2 at time t18 until the end t19 thereof, no allocation of a function F1, F2 takes place. The last overrun phase S3 at time t19 (beginning) until the end thereof at time t21, the allocation of the function F2 takes place, which is processed between time t19 and time t20. With this last allocation of the function F2, a first basic pattern 100 has thus been processed. As intended, it is provided that, for all further overrun phases S3, a further or only further basic patterns 100 are processed or the functions F1, F2 are allocated according to a basic pattern 100.

A process (preceding step), which is referred to as a so-called "demand step," can still precede each allocation S4 or the actual beginning of an execution of a function F1, F2. This step is provided within the framework of the method sequence in order to request the actual calling of the function F1, F2 at the corresponding location. This means that, at the beginning of a drive phase S2, a "demand step" can first be executed, which is or can be provided within the framework of the method sequence in order to request the actual calling of the function F1, F2 at the corresponding location. This can then possibly mean that the actual beginning of the execution of a function F1, F2 begins only after the respective execution of the demand step or after the preceding step. The representations according to FIGS. 3 to 7 are simplified in this respect.

Figure 8:
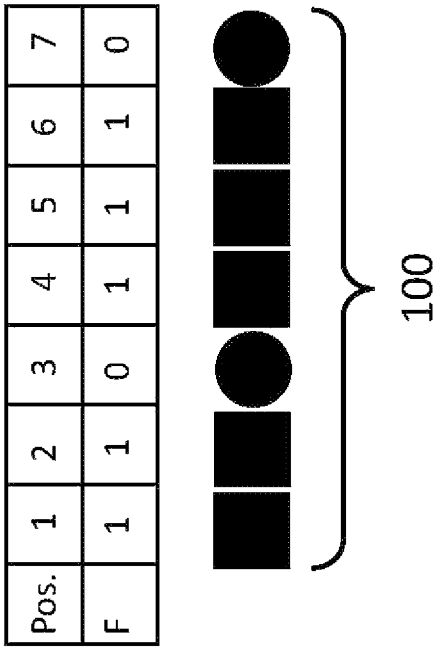
FIG. 8 shows, by way of example, a basic pattern as presented according to FIGS. 3 and 4, in the form of a stored data pattern.

FIG. 8 specifies, by way of example, a basic pattern 100, as was presented according to FIGS. 3 and 4, in the form of a stored data pattern. The upper part of FIG. 8 shows a memory with 7 positions, wherein a bit value of 0 or 1 is assigned to each position of this memory. The value 1 stands for the function F1, and the value 0 stands for the function F2. In order to prove the execution of the functions F1 and F2 according to the basic pattern 100, which execution is to be provided and may, for example, be prescribed by legal regulations, these legal regulations can thus be documented or proven by reading the corresponding memory. A corresponding basic bit pattern, as shown here, of a basic pattern 100 can be written to the memory 53 during the manufacture of a motor vehicle 10 or a manufacture of a corresponding control unit 47 with a corresponding memory 53.

In connection with the exemplary embodiment according to FIGS. 3 to 8, wherein a particular basic pattern 100 has been developed on the basis of a total of 7 functions F1, F2 to be allocated, wherein, as the basis, a particular number of functions F1 and a particular number of functions F2 was presupposed or assumed as having to be allocated, other numerical relationships can also be provided for the creation of a corresponding basic pattern. In the event that, for a particular basic pattern 100, a particular amount of allocations S4 of the function F1 is to take place and a particular amount of allocations S4 of the function F2 is to take place, the essentials are explained with the exemplary embodiment described above, in particular according to FIGS. 3 to 5.

Table 1 of FIG. 10 provides an overview of reference values that can be used in various exemplary cases in order to ascertain or determine a basic pattern 100. The first row indicates a continuous number of the respective example (number n); the second column, characterized by a percent sign, indicates the percentage in which a function, e.g., function F2, is to be part of the basic pattern 100. Column three indicates the number of allocations S4, which is provided for the function F1 in a total of 100 allocations S4 of the functions F1, F2. In connection with the respective percentage of the same row, column four indicates which divisor=n2 is to be applied; the fifth column indicates the dividend as the sum of n1 and n2. In these examples, it is provided that n1+n2 is always 100. The sixth column indicates ten times the divisor=n2, n2×10. The seventh column indicates ten times the dividend, (n1+n2)×10, which here consistently has the magnitude 1000. The eighth column indicates the greatest common divisor GGT of ten times the dividend Dv and ten times the divisor Dr. In the ninth column, the smallest integer denominator gzN is ascertained and shown, and the smallest integer numerator gzZ is ascertained and shown in the tenth column. The eleventh column indicates the integer quotient QD, which results from a division of the integer numerator gzZ by the respective integer denominator gzN. The twelfth column indicates the respective remainder R of this calculation. An adaptation of this table with exemplary cases and, of course, also of analogous cases with other proportions, e.g., per mill, is readily possible. It is also readily possible to perform a distribution of the functions F1, F2 to, for example, a total of n1+n2=50 allocations. Only the step size is thus greater. It is also readily possible to perform a distribution of the functions F1, F2 to, for example, a total of n1+n2=43 allocations. The procedure remains the same. On which basis these allocations are to be performed also depends on the accuracy of the distribution, which may be required by the legislator.

Figure 9:
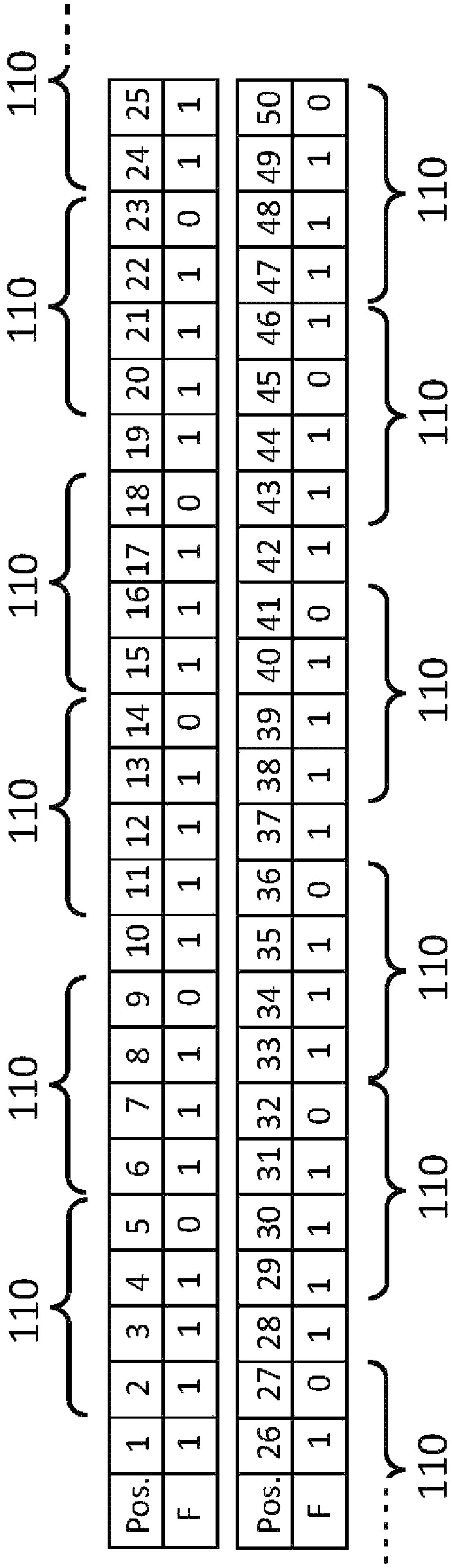
FIG. 9 shows, by way of example, a further exemplary embodiment of the present invention.

FIG. 9 shows, by way of example, on the basis of 50 functions to be allocated, a distribution in the ratio (n1+n2)/n2=100/22, i.e., a distribution in the ratio of 22 allocations S4 of a function F2 to 78 allocations S4 of a function F1 ("22% sequence"). At this point, it should be mentioned that this is the example of Table 1, n=7. As already explained with respect to FIG. 8, this figure also shows a data pattern, as could be stored as a table in a memory: Shown is a memory with 50 positions, which are shown here in two lines for reasons of space. A bit value of 0 or 1 is assigned to each position of this memory. The value 1 stands for the function F1, and the value 0 stands for the function F2. If the bit values were inverted, the corresponding representation would correspond to a 78% sequence.

When ascertaining this bit field or the basic pattern 100, the procedure is as follows:

A composition of a subpattern 110 is determined, and the number of subpatterns 110 that are part of the basic pattern 100 is determined. Possibly, one allocation S4 or several existing allocations S4 of the function F2, which are not part of a subpattern 110 but must be distributed in order to obtain the desired ratio of allocations S4 in a basic pattern 100, is/are distributed. The type of distributions of these one or more allocations S4 is determined, i.e., it is defined at which subpatterns 110 it or they are grouped.

In connection with the example according to FIG. 9, a dividend Dd and a divisor Dr are determined. A step P1 is carried out, which is at least equivalent to an integer division with the dividend Dd and the divisor Dr. The dividend Dd=100 corresponds to a sum of the predetermined number n1=78 of allocations S4 of the one function F1 of a multiple of a basic pattern 100 (this multiple includes the single time of a basic pattern 100) and the predetermined number n2=22 of allocations S4 of the other function F2 corresponds to an equal multiple of a basic pattern 100 (this multiple also includes the single time of a basic pattern 100). The divisor Dr corresponds to the predetermined number n2=22 of allocations S4 of the other function F2 of a multiple of a basic pattern 100 (this multiple includes the single time of a basic pattern 100). Ultimately, the reciprocal of the ratio of the proportion of the allocations S4 of the one function F2 to the entirety of the allocations S4 of the functions F1, F2 is ascertained here.

Before carrying out step P1, either the dividend Dd and the divisor Dr are fully reduced or it is determined that they are already fully reduced. In this case, it is determined that the ratio (n1+n2)/n2=100/22 is not fully reduced. Accordingly, the ratio (n1+n2)/n2=100/22 is fully reduced to (n1+n2)/n2=50/11. The integer quotient QD of the integer division (n1+n2)/n2=50/11 is determined in step P2, QD=4. The number QD corresponds to a length of a subpattern 110, which thus comprises four allocations S4 of the functions F1, F2. The remainder R of the integer division is determined in step P3 to be 6. The number n3 of subpatterns 110 of the basic pattern 100 to be ascertained is determined in step P4; the number n3 corresponds to the magnitude of the divisor Dr=11=n3. A number n4 of functions F1 is determined, wherein the number n4 corresponds to the magnitude of the remainder R, n4=R=6. The basic pattern (100) is formed from this number n4=6 of functions F1 and with the number n3=11 of subpatterns 110. For the purpose of achieving as uniform a distribution as possible of the allocations of the functions F1, F2, the subpatterns 110 are arranged in succession within a subpattern 110 in the same temporal orientation of the allocations of the functions F1, F2.

During the formation of the subpattern 110, the simplest procedure is that a number of allocations S4 of a subpattern 110 corresponds to the magnitude of the integer quotient QD. In this case, the allocations S4 of the function F1 are preferably arranged directly next to one another and the allocations S4 of the function F2 are arranged directly, preferably after, (before or after them). The subpatterns 110 are preferably lined up in the same orientation. The other allocations S4 of the functions F1 that result from the remainder R still have to be inserted. If the remainder is zero, the basic pattern 100 is formed only from subpatterns 110 or from one subpattern 110. If the remainder is not equal to zero, as in the 22% example, here 4, the procedure is as follows:

If the remainder R is greater than half the integer numerator gzZ, a particular number, or a number to be determined, of the subpatterns 110 is extended by one allocation S4 of a function F1. A prerequisite for the distribution of these allocations S4 is that an integer quotient QDX is first determined by a further integer division PX. The integer quotient QDX is the integer result of the division PX of the integer numerator gzZ with the difference of the integer numerator gzZ and the remainder R. For the example according to FIG. 9, the integer numerator gzZ is 11, the remainder is 6, the difference is 5, and the integer quotient QDX is thus 2; a remainder of 1 remains. The particular part of the subpatterns 110 that is extended by an allocation S4 of a function F1 to form a modified subpattern 120 begins with the first subpattern 110, wherein every second subpattern 110 is not extended. This procedure results from the just specified determination of the integer quotient QDX=2 (every second subpattern is not to be extended by prepending). Accordingly, FIG. 9 respectively shows, at positions 1, 10, 19, 28, 37, 46, a subpattern 110 extended with one allocation S4 of a function F1 by prepending.

In order to fulfill as far as possible the required ratio of (n1+n2)/n2=100/22 over the entire basic pattern 100 and in parts, i.e., also in portions, the number n4=6 of functions F1 is to be distributed as uniformly as possible to the number n3 of subpatterns 110.

The invention claimed is:

1. A method for a motor vehicle, the motor vehicle including (a) a processor system and (b) a drive train, the drive train including an internal combustion engine, the method comprising the following steps:

during one or more trips in which the motor vehicle is operated in overrun phases and drive phases, initiating, by the processor system, executions of a particular plurality of functions to be performed only during the overrun phases, wherein:

the processor system is programmed with a predefined pattern that defines a core sequence of the plurality of functions relative to one another; and the initiating is performed so that the executions are initiated in an order that is selected by repeatedly instantiating the predefined pattern over the course of the overrun phases such that which of the plurality of functions is initiated first in one of the overrun phases depends on the initiating of executions of an immediately preceding one of the overrun phases.

2. The method according to claim 1, wherein each of the particular plurality of functions is allocated only within a framework of the predefined pattern.

3. The method according to claim 1, wherein the basic predefined pattern has a predeterminable ratio of initiations of executions of one of the plurality of functions to initiations of executions of another and of the plurality of the other functions.

4. The method according to claim 1, wherein the predefined pattern only has a predetermined number of initiations of executions of one of the plurality of functions and a predetermined number of initiations of executions of another of the plurality of functions.

5. The method according to claim 1, wherein the initiating is performed such that, after a termination of an instance of one of the plurality of functions due to a transition from one of the overrun phases to one of the drive phases, in an immediately succeeding one of the overrun phases, the initiating is performed according to the predefined pattern, by starting with a position of the pattern that follows a position of the pattern corresponding to the terminated instance of the one of the plurality of functions.

6. The method according to claim 1, wherein the initiating is performed such that, after a termination of an instance of one of the plurality of functions, as a final initiation of one of the instances of the predefined pattern, the termination being due to a transition from one of the overrun phases to one of the drive phases, in an immediately succeeding one of the overrun phases, the initiating is performed by starting with an initiation corresponding to a start of a next instantiation of the predefined pattern.

7. The method according to claim 1, wherein a third further function, which is not one of the particular plurality of functions is initiated between initiations of two instantiations of the predefined pattern.

8. A method for a motor vehicle, the motor vehicle including (a) a processor system and (b) a drive train, the drive train including an internal combustion engine, the method comprising the following steps:

carrying out, by the processor system, a step that is at least equivalent to an integer division (I) using a dividend that corresponds to a sum of (a) a respective first predetermined number of instantiations of one of a particular plurality of functions, which plurality of functions are to be performed only during overrun phases of the motor vehicle, and (b) a respective second predetermined number of instantiations of another of the plurality of functions and (II) using the respective predetermined number of instantiations of the other one of the plurality of functions as a divisor, to thereby ascertain an integer quotient of the integer division and a remainder of the integer division;

generating, by the processor system and based on the ascertained integer quotient and the ascertained remainder, a pattern that defines a core sequence of the particular plurality of functions relative to one another; and during one or more trips in which the motor vehicle is operated in one or more of the overrun phases and one or more drive phases, initiating, by the processor system, executions of the particular plurality of functions, wherein the initiating is performed so that the executions are initiated in an order that is selected by repeatedly instantiating the generated pattern.

9. The method according to claim 8, further comprising, before carrying out the step that is at least equivalent to the integer division, either fully reducing the dividend and the divisor or determining the dividend and the divisor are fully reduced.

10. The method according to claim 8, wherein the generating of the pattern includes setting a number of subpatterns of the pattern equal to the divisor.

11. The method according to claim 10, wherein the generating of the pattern includes setting a number of total function initiations allocated to each of the subpatterns equal to a magnitude of the integer quotient.

12. The method according to claim 11, wherein the generating of the patterns includes setting a number of instantiations of the one of the particular plurality of functions to be implemented in the pattern besides for all of the number of subpatterns to a magnitude of the remainder.

13. The method according to claim 12, wherein the pattern is formed entirely from a combination of the number of the instantiations of the one of the plurality of functions and all of the number of subpatterns.

14. The method according to claim 12, wherein the number of instantiations of the one of the particular plurality of functions is uniformly distributed to the number of subpatterns.

15. The method according to claim 1, wherein the predefined pattern is stored in a memory, the processor system being programmed to obtain the predefined pattern stored in the memory.

16. The method according to claim 1, further comprising storing in a memory a feature by reference to which the processor system is able to track progress through the predefined pattern, wherein the initiating of the functions is performed based on the tracking.

17. The method according to claim 16, wherein the feature is a pointer to a memory location of a last position within the predefined pattern according to which an initiation of a last one of the initiated executions was performed or a next position within the predefined pattern that follows a position corresponding to the initiation of the last one of the initiated executions.

18. The method according to claim 1, further comprising generating, by the processor system, the predefined pattern.

19. The method according to claim 1, wherein the predefined pattern is generated outside of the vehicle and is then stored in a memory which the processor system is programmed to access.

20. The method according to claim 1, wherein the plurality of functions include a function for monitoring a quantity of injected fuel and a function for adapting a small quantity of injected fuel.

21. A non-transitory machine-readable memory on which is stored instructions that are executable by a processor of a motor vehicle, the motor vehicle including a drive train, the drive train including an internal combustion engine, the instructions, when executed by the processor, causing the processor to perform the following steps:

during one or more trips in which the motor vehicle is operated in overrun phases and drive phases, initiating executions of a particular plurality of functions to be performed only during the overrun phases, wherein:

the instructions program the processor with a predefined pattern that defines a core sequence of the plurality of functions relative to one another; and the initiating is performed so that the executions are initiated in an order that is selected by repeatedly instantiating the predefined pattern over the course of the overrun phases such that which of the plurality of functions is initiated first in one of the overrun phases depends on the initiations of an immediately preceding one of the overrun phases.

22. A control unit of a motor vehicle, the motor vehicle including a drive train, the drive train including an internal combustion engine, the control unit comprising a processor that is configured to:

during one or more trips in which the motor vehicle is operated in overrun phases and drive phases, initiate executions of a particular plurality of functions to be performed only during the overrun phases, wherein:

the processor is programmed with a predefined pattern that defines a core sequence of the plurality of functions relative to one another; and the initiating is performed so that the executions are initiated in an order that is selected by repeatedly instantiating the predefined pattern over the course of the overrun phases such that which of the plurality of functions is initiated first in one of the overrun phases depends on the initiations of an immediately preceding one of the overrun phases.

* * * * *